UNITED STATES PATENT OFFICE.

CHARLES L. FOWLER, OF PHILADELPHIA, PENNSYLVANIA, ASSIGNOR OF ONE-HALF HIS RIGHT TO EDWARD H. TWINING, OF SAME PLACE.

IMPROVEMENT IN ROOFING COMPOSITIONS.

Specification forming part of Letters Patent No. 181,528, dated August 29, 1876; application filed July 15, 1876.

*To all whom it may concern:*

Be it known that I, CHARLES L. FOWLER, of the city and county of Philadelphia, in the State of Pennsylvania, have invented a new and useful Roofing Compound, of which I hereby declare the following to be a full, clear, and precise description:

My invention relates to a class of compositions which are employed for the manufacture of composition roofing material, but is especially designed for use in an apparatus for the manufacture of composition roofing for which I have applied for Letters Patent of the United States.

The following is a specification of the ingredients of my compound, and the method of their making and compounding: Take about forty gallons of a product obtained by the distillation of coal-tar at 460° for soft roofing, at 465° to 470° for medium, and at 475° for hard, (these temperatures are specified exactly, because above 475° the product becomes too near pitch, and below 460° contains too much of the lighter oils of coal-tar,) and dissolve it in a vessel by moderate heat until thoroughly and evenly melted. Then take four bushels of dry sifted sand and four bushels of dry clay, pulverized and sifted, and mix them thoroughly together. Then add the mixed sand and clay to the melted product above named by sifting them into it through a fine sieve. When thus combined, the entire compound is to be continually stirred, until thoroughly mixed, to ascertain which a skimmer of about a quarter-inch mesh can be used to dip up from the bottom while the entire compound is being cooked by a moderate fire. When the ingredients are thoroughly commingled, and all lumpy consistency overcome, the compound is ready for use.

The sand imparts a granite body and the clay toughness and elastic strength.

The relative proportions of the ingredients may be slightly varied, but, from experiment, I find that stated to be the best.

The compound is quite free from brittleness, is of great endurance, and will stand heat or cold of any climate equally well.

Having thus described my invention, I claim and desire to secure by Letters Patent of the United States—

A roofing composition composed of sifted sand, dry pulverized clay, in its natural state, and a product distilled from coal-tar within the degrees 460 to 470, so as to permit of the retention of some of the lighter oils, when obtained and combined substantially in the manner and proportions hereinbefore set forth.

In testimony whereof I have hereunto signed my name.

CHARLES L. FOWLER.

Witnesses:
   J. BONSALL TAYLOR,
   E. H. TWINING.